US008526768B2

(12) United States Patent
Kinpara et al.

(10) Patent No.: US 8,526,768 B2
(45) Date of Patent: Sep. 3, 2013

(54) LIGHT CONTROL DEVICE

(75) Inventors: Yuhki Kinpara, Chiyoda-ku (JP);
Masayuki Ichioka, Chiyoda-ku (JP);
Junichiro Ichikawa, Chiyoda-ku (JP);
Satoshi Oikawa, Chiyoda-ku (JP);
Yasuhiro Ishikawa, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 320 days.

(21) Appl. No.: 12/798,046

(22) Filed: Mar. 29, 2010

(65) Prior Publication Data
US 2010/0264855 A1 Oct. 21, 2010

(30) Foreign Application Priority Data
Mar. 31, 2009 (JP) ................................ 2009-088262

(51) Int. Cl.
G02F 1/035 (2006.01)
G02F 1/01 (2006.01)
G02B 6/26 (2006.01)
G02B 6/42 (2006.01)

(52) U.S. Cl.
USPC ........... 385/2; 385/1; 385/15; 385/39; 385/40

(58) Field of Classification Search
USPC ....................................................... 385/2, 40
See application file for complete search history.

(56) References Cited

U.S. PATENT DOCUMENTS

| 6,016,198 | A | * | 1/2000 | Burns et al. | 356/477 |
| 6,535,320 | B1 | * | 3/2003 | Burns | 359/245 |
| 8,086,078 | B2 | * | 12/2011 | Sugiyama | 385/2 |
| 2005/0013522 | A1 | | 1/2005 | Doi | |
| 2010/0067840 | A1 | | 3/2010 | Sugiyama | |

FOREIGN PATENT DOCUMENTS

| JP | 4-254819 A | 9/1992 |
| JP | 7-049511 A | 2/1995 |
| JP | 2583480 B2 | 2/1997 |
| JP | 2746216 B2 | 5/1998 |
| JP | 3139009 A | 2/2001 |
| JP | 3139009 B2 | 2/2001 |
| JP | 2004-318113 A | 11/2004 |
| JP | 2005-037547 A | 2/2005 |
| JP | 2010-072129 A | 4/2010 |

* cited by examiner

*Primary Examiner* — Ryan Lepisto
(74) *Attorney, Agent, or Firm* — Chapman and Cutler LLP

(57) ABSTRACT

A light control device with a reduced electric loss is provided which can suppress a phenomenon of electrically reflecting a high-frequency signal even when it employs a dielectric anisotropic substrate. A light control device includes a signal electrode formed on a dielectric anisotropic substrate and ground electrodes disposed with the signal electrode interposed therebetween. Here, the signal electrode includes at least two signal electrode portions disposed in directions in which the dielectric constant of the substrate is different from each other and a curved connecting portion connecting the at least two signal electrode portions. The connecting portion is configured so that the characteristic impedance in parts connected to the at least two signal electrode portions is equal to that of the corresponding signal electrode portion, and the characteristic impedance in the connecting portion between the at least two signal electrode portions continuously varies.

5 Claims, 3 Drawing Sheets

LIGHT CONTROL DEVICE

CROSS-REFERENCE TO RELATED APPLICATION

The present application claims priority over Japanese Application JP2009-088262 filed on Mar. 31, 2009, the contents of which are hereby incorporated into this application by reference.

BACKGROUND OF THE INVENTION

1. Field of the Invention

The present invention relates to a light control device, and more particularly, to a light control device using a dielectric anisotropic substrate.

2. Description of the Related Art

Light control devices in which a signal electrode and a ground electrode are formed on a substrate formed of a dielectric anisotropic material, a high-frequency signal is applied to the signal electrode, and the high-frequency signal is propagated along the signal electrode are generally used. Examples of the light control devices include an optical modulator in which a Mach-Zehnder waveguide having a Y axis as a light-propagating direction is formed in a wafer substrate cut by a plane having the X axis of $LiNbO_3$ crystal as a normal vector and a signal electrode and a ground electrode for modulating an optical wave propagated in the waveguide are formed on the substrate, or a light control device performing a modulation operation and an optical path switching operation by interaction of an optical wave and an electric field. Examples of the light control device switching a signal line with an optical waveguide include a light control device using a directional coupler as shown in Patent Literature 2, a light control device in which a large difference in refractive index is provided and light is concentrated on an arm having a high refractive index as shown in Patent Literature 3, a light control device using the total reflection as shown in Patent Literature 4, and a light control device using a Mach-Zehnder interferometer as shown in Patent Literature 5.

In such light control devices, since the dielectric constant is different between the light-propagating direction (Y axis) and a direction (Z axis) perpendicular to the light-propagating direction, an impedance mismatch occurs between the signal electrode along the Y axis direction and the signal electrode along the Z axis direction with the same electrode structure. The impedance mismatch causes an electroreflection phenomenon in a high-frequency area, thereby deteriorating the transmittance of the high-frequency signal.

To solve the above-mentioned problem, Patent Literature 1 discloses that an electrode structure having the middle value between the impedance values before and after it is bent is formed in the middle of the signal electrode which is bent at a right angle.

However, in the electrode structure disclosed in Patent Literature 1, the impedance gradually varies and thus it can be expected to reduce the electroreflection phenomenon slightly, but the impedance rapidly varies locally and the electroreflection phenomenon occurs, whereby a satisfactory loss reduction effect cannot be expected. In addition, the electrode structure for adjusting the impedance is a structure in which a plane of at least one of the signal electrode and the ground electrode opposed to the other electrode has a corner due to the gradual adjustment thereof. The structure having this corner causes the deterioration in high-frequency characteristic.

Patent Literature 1: JP2005-37547A
Patent Literature 2: Japanese Patent No. 3139009
Patent Literature 3: Japanese Patent No. 2746216
Patent Literature 4: Japanese Patent No. 2583480
Patent Literature 5: JP1995-49511A

SUMMARY OF THE INVENTION

The invention is contrived to solve the above-mentioned problems. An object of the invention is to provide a light control device with a reduced electric loss which can suppress a phenomenon of electrically reflecting a high-frequency signal even when it employs a dielectric anisotropic substrate.

According to an aspect of the invention, there is provided a light control device including a signal electrode formed on a dielectric anisotropic substrate and ground electrodes disposed with the signal electrode interposed therebetween, wherein the signal electrode includes at least two signal electrode portions disposed in directions in Which the dielectric constant of the substrate is different and a curved connecting portion connecting the at least two signal electrode portions. Here, the connecting portion is configured so that the characteristic impedance in parts connected to the at least two signal electrode portions is equal to that of the corresponding signal electrode portion, and the characteristic impedance in the connecting portion between the at least two signal electrode portions continuously varies.

According to another aspect of the invention, there is provided a light control device including a signal electrode formed on a dielectric anisotropic substrate and ground electrodes disposed with the signal electrode interposed therebetween, wherein the signal electrode includes at least two signal electrode portions disposed in directions in which the dielectric constant of the substrate is different and a curved connecting portion connecting the at least two signal electrode portions. Here, the at least two signal electrode portions have the same characteristic impedance, and the connecting portion is configured so that the characteristic impedance in parts connected to the at least two signal electrode portions is equal to that of the corresponding signal electrode portion.

In the light control device, the curved connecting portion of the signal electrode may vary in shape depending on an angle about the at least two signal electrode portions.

In the light control device, the dielectric anisotropic substrate may be a substrate having an electro-optical effect, an optical waveguide may be formed on the substrate, and the signal electrode and the ground electrodes may constitute a modulation electrode for modulating an optical wave propagated in the optical waveguide.

In the light control device, the dielectric anisotropic substrate may be a substrate having an electro-optical effect, an optical waveguide may be formed on the substrate, and the signal electrode and the ground electrodes may constitute an optical path switching electrode for switching an optical path by an interaction of an optical wave propagated in the optical waveguide and an electric signal propagated in the signal electrode.

According to the above-mentioned aspect, the light control device includes a signal electrode formed on a dielectric anisotropic substrate and ground electrodes disposed with the signal electrode interposed therebetween, the signal electrode includes at least two signal electrode portions disposed in directions in which the dielectric constant of the substrate is different and a curved connecting portion connecting the at least two signal electrode portions, and the connecting portion is configured so that the characteristic impedance in parts connected to the at least two signal electrode portions is equal to that of the corresponding signal, electrode portion, and the characteristic impedance in the connecting portion between the at least two signal electrode portions continuously varies. Accordingly, it is possible to prevent the discontinuous variation in local characteristic impedance, thereby suppressing the phenomenon of electrically reflecting a high-frequency signal. As a result, it is possible to provide a light control device with a small electric loss.

According to the above-mentioned aspect, the light control device includes a signal electrode formed on a dielectric anisotropic substrate and ground electrodes disposed with the signal electrode interposed therebetween, the signal electrode includes at least two signal electrode portions disposed in directions in which the dielectric constant of the substrate is different and a curved connecting portion connecting the at least two signal electrode portions, and the at least two signal electrode portions have the same characteristic impedance, and the connecting portion is configured so that the characteristic impedance in parts connected to the at least two signal electrode portions is equal to that of the corresponding signal electrode portion. Accordingly, since the characteristic impedance is constant regardless of the variation in the wiring direction of the signal electrode, the electroreflection phenomenon due to the mismatch in characteristic impedance does not occur. As a result, it is possible to provide a light control device with a small electric loss.

According to the above-mentioned configuration, the curved connecting portion of the signal electrode varies in shape depending on an angle about the at least two signal electrode portions. Accordingly, a corner portion is not formed in a part of the connecting portion of the signal electrode, thereby suppressing the phenomenon of electrically reflecting the high-frequency signal. As a result, it is possible to provide a light control device with a smaller electric loss.

According to the above-mentioned configuration, the dielectric anisotropic substrate is a substrate having an electro-optical effect, the optical waveguide is formed on the substrate, and the signal electrode and the ground electrodes constitute a modulation electrode for modulating an optical wave propagated in the optical waveguide. Accordingly, the light control device can be used as an optical modulator, thereby suppressing the phenomenon of electrically reflecting a high-frequency signal applied to the optical modulator. As a result, it is possible to provide a light control device with a small electric loss.

According to the above-mentioned configuration, the dielectric anisotropic substrate is a substrate having an electro-optical effect, the optical waveguide is formed on the substrate, and the signal electrode and the ground electrodes constitute an optical path switching electrode for switching an optical path by an interaction of an optical wave propagated in the optical waveguide and an electric signal propagated in the signal electrode. Accordingly, the light control device can be used as a light control device having an optical path switching function, thereby suppressing the phenomenon of electrically reflecting a high-frequency signal applied to the light control device. As a result, it is possible to provide a light control device with a small electric loss.

DESCRIPTION OF THE PREFERED EMBODIMENTS

Hereinafter, a light control device according to an embodiment of the invention will be described in detail.

The light control device according to an embodiment of the invention includes a signal electrode formed on a dielectric anisotropic substrate and ground electrodes disposed with the signal electrode interposed therebetween, the signal electrode includes at least two signal electrode portions disposed in directions in which the dielectric constant of the substrate is different and a curved connecting portion connecting the at least two signal electrode portions, and the connecting portion is configured so that the characteristic impedance in parts connected to the at least two signal electrode portions is equal to that of the corresponding signal electrode portion, and the characteristic impedance in the connecting portion between the at least two signal electrode portions continuously varies.

To match the characteristic impedance, the material of the signal electrode, the width or height of the signal electrode, the gaps between the signal electrode and the ground electrodes, the material filled in a space between the signal electrode and the ground electrodes, or the physical constants (dielectric constant or dielectric loss tangent) or the shape (thickness or sectional shape) of the substrate having an electro-optical effect can be used. A characteristic impedance matching mechanism using the gaps between the signal electrode and the ground electrodes as a parameter will be described as an example of the connecting portion.

A dielectric anisotropic substrate having different dielectric constants in perpendicular directions which are parallel to the surface of the substrate will be exemplified as the dielectric anisotropic substrate. Specifically, a substrate (X-cut substrate) which is cut by the plane having the X axis of $LiNbO_3$ crystal as a normal vector is used. In this substrate, the Y axis direction and the Z axis direction are the perpendicular directions which are parallel to the surface of the substrate and the dielectric constants in the Y axis direction and the Z axis direction are different from each other.

Figure 1:
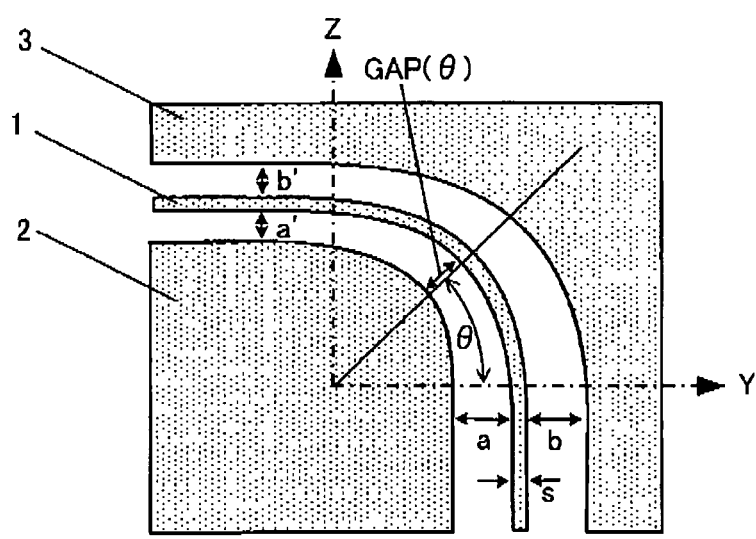
FIG. 1 is a plan view illustrating an electrode structure for a high-frequency signal used in a light control device according to an embodiment of the invention.

FIG. 1 shows a curved connecting portion connecting two signal electrode portions. Here, the signal electrode 1 and the ground electrodes 2 and 3 are formed on the X-cut $LiNbO_3$ crystal substrate and the signal electrode is bent by 90 degrees. The signal electrode portion (not shown) extending downward in the Z axis direction is disposed on the lower side the connecting portion and the signal electrode portion extending to the left in the Y axis direction is disposed on the left side of the connecting portion. The ground electrodes are disposed with the signal electrode of the corresponding electrodes portions interposed therebetween.

When the thickness of the electrodes is 27 μm, the width s of the signal electrode 1 is 7 μm, and the gap between the signal electrode 1 and the ground electrodes 2 and 3 is 25 μm, the characteristic impedance of the signal electrode portion in the Y axis direction is 39.3 Ω, and the characteristic impedance of the signal electrode portion in the Z axis direction is 37.4 Ω. Accordingly, to match the characteristic impedance of the signal electrode portion in the Z axis direction with the characteristic impedance (39.3 Ω) of the signal electrode portion in the Y axis direction, it is necessary to set the gap between the signal electrode and the ground electrodes in the Z axis direction to 29 μm. That is, in FIG. 1, a=b=29 μm and a'=b'=25 μm are set.

The connecting portion connecting the signal electrode portion in the Y axis direction and the signal electrode portion in the Z axis direction has a circular-arc shape having a small reflection in the structure as shown in FIG. 1. In the circular-arc portion, the gap GAP(θ) between the signal electrode 1 and the ground electrodes 2 and 3 varies from a=b=29 μm to a'=b'=25 μm in a tapered shape. This tapered shape is expressed by Expression 1.

Expression 1

$$GAP(\theta)=a-(a-a')\times(\theta/90°)$$ Expression 1

Here, θ is expressed in degrees.

As shown in FIG. 1, since the connecting portion for adjusting the impedance has a structure in which the gap between the signal electrode and the ground electrodes continuously varies, the impedance does not gradually vary and thus the phenomenon of electrically reflecting a high-frequency signal is further suppressed. That is, the shape of the connecting portion is preferably a curved shape as shown in FIG. 1. By causing the curved portion of the signal electrode to vary in shape depending on the angles about the two signal electrode portions, no corner portion is formed in a part of the connecting portion of the signal electrode, thereby suppressing the phenomenon of electrically reflecting a high-frequency signal. As a result, it is possible to obtain a light control device with a smaller electric loss.

The light control device may include a signal electrode formed on a dielectric anisotropic substrate and ground electrodes disposed with the signal electrode interposed therebetween, the signal electrode including at least two signal electrode portions (for example, the signal electrode portion in the Y axis direction and the signal electrode portion in the Z axis direction) disposed in directions in which the dielectric constant of the substrate is different and a curved connecting portion (the connecting portion shown in FIG. 1) connecting the at least two signal electrode portions, and the at least two signal electrode portions having the same characteristic impedance (that is, the material of the signal electrode, the width or height of the signal electrode, the gap between the signal electrode and the ground electrodes, the material filled in the space between the signal electrode and the ground electrode, the physical constants (such as dielectric constant or dielectric loss tangent) or shape (such as thickness or sectional shape) of the substrate having the electro-optical effect, and the like are adjusted to match the characteristic impedance of the signal electrode portion in the Y axis direction with the characteristic impedance of the signal electrode portion in the Z axis direction), and the connecting portion being configured so that the characteristic impedance in parts connected to the at least two signal electrode portions is equal to that of the corresponding signal electrode portion. That is, as shown in FIG. 1, when the characteristic impedance of the signal electrode portion in the Y axis direction is equal to the characteristic impedance of the signal electrode portion in the Z axis direction, it is preferable that the gap between the signal electrode and the ground electrodes is adjusted so that the characteristic impedance is constant even with the variation in angle θ in FIG. 1.

To test the advantage of the high-frequency signal electrode structure as the connecting portion used in the light control device according to the embodiment of the invention, the amount of reduced electroreflection for a high-frequency signal of 0 to 70 GHz was measured in the electrode structure (a=b=29 μm and a'=b'=25 μm) shown in FIG. 1 and an electrode structure (comparative example) in which the gap between the circular-arc portions is constant with a=b=a'=b'=25 μm. The measurement result is shown in FIG. 2.

Figure 2:
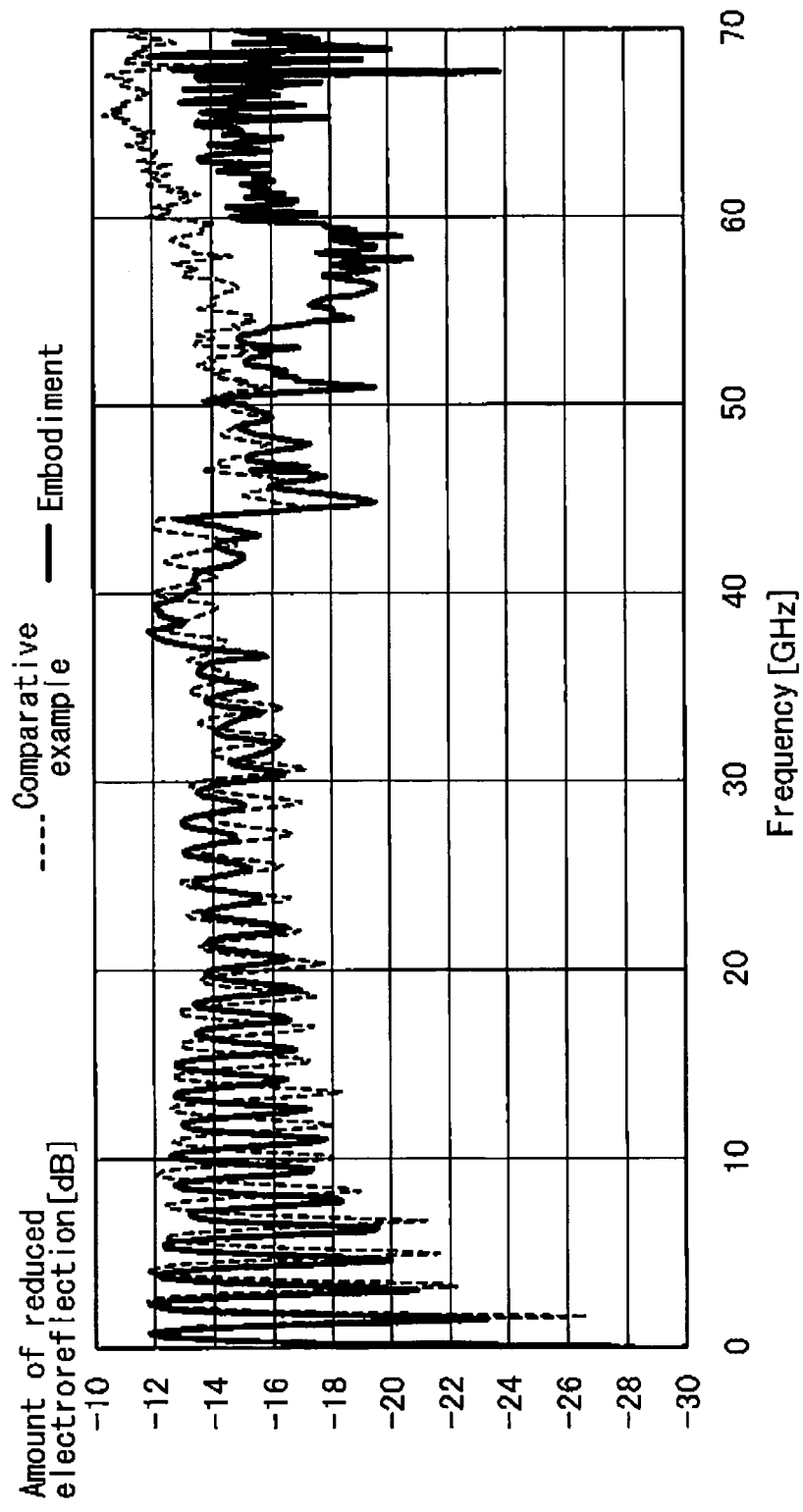
FIG. 2 is a graph illustrating the measurement result of an amount of reduced electroreflection in the electrode structure for a high-frequency signal in the light control device according to the embodiment of the invention.

It can be easily understood from the result shown in FIG. 2 that the connecting portion used in the light control device according to the embodiment of the invention is improved by about 2 dB in comparison with the comparative example.

Figure 3:
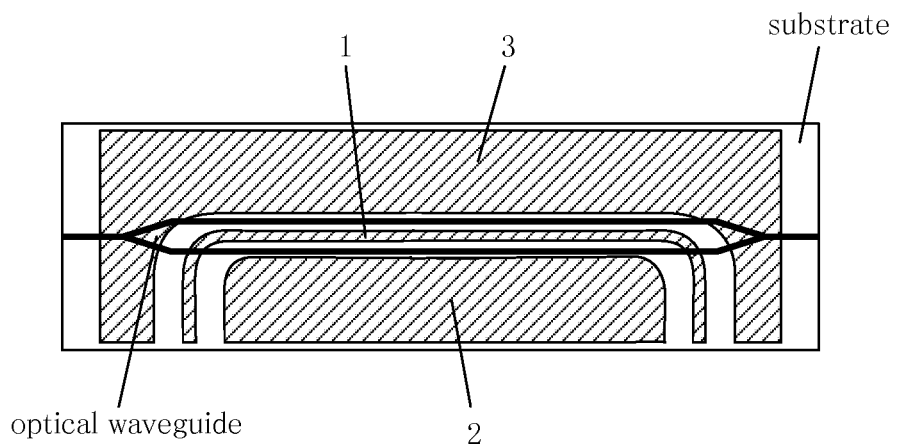
FIG. 3 is a schematic view illustrating an embodiment of the invention wherein the signal electrode and the ground electrodes constitute a modulation electrode.

In the light control device as shown in FIG. 3, by forming the dielectric anisotropic substrate out of a substrate having an electro-optical effect, forming an optical waveguide on the substrate, and causing the signal electrode (1) and the ground electrodes (2,3) to constitute a modulation electrode for modulating an optical wave propagated in the optical waveguide, the light control device can be used as an optical modulator. Accordingly, since the high-frequency reflection loss is reduced, it is possible to obtain a high-speed and wide-bandwidth light control device of several tens of GHz or 100 GHz, which will be in demand in the future.

Figure 4:
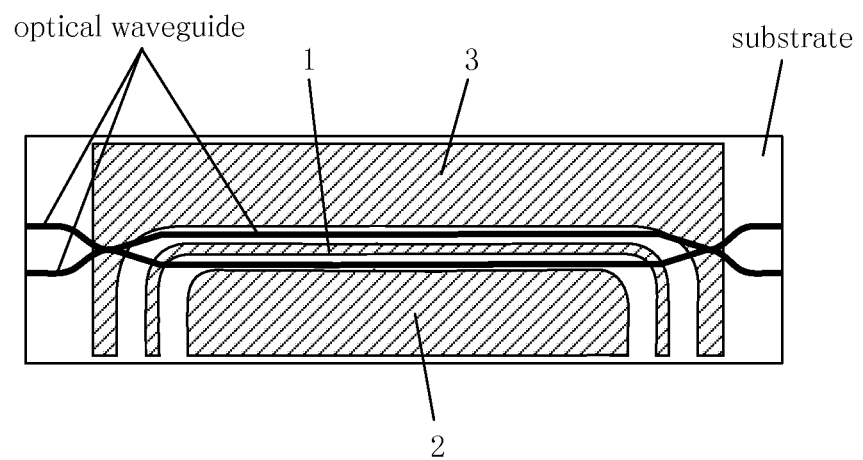
FIG. 4 is a schematic view illustrating an embodiment of the invention wherein the signal electrode and the ground electrodes constitute an optical path switching electrode.

In the light control device as shown in FIG. 4, by forming the dielectric anisotropic substrate out of a substrate having an electro-optical effect, forming an optical waveguide on the substrate, and causing the signal electrode (l) and the ground electrodes (2,3) to constitute an optical path switching electrode for switching an optical path by an interaction of an optical wave propagated in the optical waveguide and an electric signal propagated in the signal electrode, the light control device can be used as a light control device having an optical path switching function. Accordingly, the phenomenon of electrically reflecting a high-frequency signal applied to the light control device can be suppressed, thereby obtaining a light control device having an optical path switching function with a small electric loss.

As described above, according to the invention, it is possible to provide a light control device with a reduced electric loss which can suppress a phenomenon of electrically reflecting a high-frequency signal even when it employs a dielectric anisotropic substrate.

What is claimed is:

1. A light control device comprising a signal electrode formed on a dielectric anisotropic substrate and ground electrodes disposed with the signal electrode interposed therebetween, wherein the signal electrode includes at least two signal electrode portions disposed in directions in which the dielectric constant of the substrate is different and a curved connecting portion connecting the at least two signal electrode portions, the at least two signal electrode portions have different characteristic impedance, the connecting portion is configured such that a gap between the signal electrode and the ground electrodes in the connecting portion is equal to that in the signal electrode portion in each part connected to the at least two signal electrode portions so that the characteristic impedance in parts connected to the at least two signal electrode portions is equal to that of the corresponding signal electrode portion, and the gap between the signal electrode and the ground electrodes continuously varies in the connecting portion between the at least two signal electrode portions so that the characteristic impedance in the connecting portion between the at least two signal electrode portions continuously varies.

2. A light control device comprising a signal electrode formed on a dielectric anisotropic substrate and ground electrodes disposed with the signal electrode interposed therebetween, wherein
the signal electrode includes at least two signal electrode portions disposed in directions in which the dielectric constant of the substrate is different and a curved connecting portion connecting the at least two signal electrode portions,
the at least two signal electrode portions have the same characteristic impedance,
the connecting portion is configured such that a gap between the signal electrode and the ground electrode in the connecting portion is equal to that in the signal electrode portion in each part connected to the at least two signal electrode portions so that the characteristic impedance in parts connected to the at least two signal electrode portions is equal to that of the corresponding signal electrode portion ,and
the gap between the signal electrode and the ground electrodes is adjusted in the connecting portion between the at least two signal electrode portions so that the characteristic impedance in the connecting portion between the at least two signal electrode portions is constant.

3. The light control device according to claim 1 or 2, wherein the curved connecting portion of the signal electrode varies in shape depending on an angle about the at least two signal electrode portions.

4. The light control device according to claim 1 or 2, wherein the dielectric anisotropic substrate is a substrate having an electro-optical effect, an optical waveguide is formed on the substrate, and the signal electrode and the ground electrodes constitute a modulation electrode for modulating an optical wave propagated in the optical waveguide.

5. The light control device according to claim 1 or 2, wherein the dielectric anisotropic substrate is a substrate having an electro-optical effect, an optical waveguide is formed on the substrate, and the signal electrode and the ground electrodes constitute an optical path switching electrode for switching an optical path by an interaction of an optical wave propagated in the optical waveguide and an electric signal propagated in the signal electrode.

* * * * *